US009536090B2

United States Patent
Teller et al.

(10) Patent No.: US 9,536,090 B2
(45) Date of Patent: Jan. 3, 2017

(54) METHOD OF DEFENDING A COMPUTER FROM MALWARE

(71) Applicant: Check Point Software Technologies Ltd., Tel-Aviv (IL)

(72) Inventors: Tomer Teller, Tel-Aviv (IL); Assaf Segal, Tel-Aviv (IL)

(73) Assignee: CHECK POINT SOFTWARE TECHNOLOGIES LTD., Tel-Aviv (IL)

( * ) Notice: Subject to any disclaimer, the term of this patent is extended or adjusted under 35 U.S.C. 154(b) by 257 days.

(21) Appl. No.: 13/902,818

(22) Filed: May 26, 2013

(65) Prior Publication Data

US 2014/0351941 A1    Nov. 27, 2014

(51) Int. Cl.
*G06F 21/00* (2013.01)
*G06F 21/56* (2013.01)

(52) U.S. Cl.
CPC ............ *G06F 21/566* (2013.01); *G06F 21/56* (2013.01)

(58) Field of Classification Search
CPC .. H04L 63/14; H04L 63/1408; H04L 63/1416; G06F 21/577; G06F 21/60; G06F 21/56; G06F 21/566
See application file for complete search history.

(56) References Cited

U.S. PATENT DOCUMENTS

| 2004/0128471 | A1* | 7/2004 | Oakley et al. ............... 711/220 |
| 2009/0327650 | A1* | 12/2009 | Neuerburg .................... 711/219 |
| 2014/0082751 | A1* | 3/2014 | Vipat et al. ..................... 726/30 |
| 2014/0325664 | A1* | 10/2014 | Nekhoroshev .................. 726/26 |

* cited by examiner

*Primary Examiner* — Kendall Dolly
(74) *Attorney, Agent, or Firm* — Mark M Friedman

(57) ABSTRACT

To defend a computer against malware, first executable code, of the computer, that includes a signature that identifies an address, in the computer's memory, of a respective data structure that is potentially vulnerable to tampering, is identified. The first executable code is copied to provide second executable code that emulates the first executable code using its own respective data structure. The first executable code is modified to jump to the second executable code before accessing the data structure, and also so that the signature identifies the address of a guard page.

12 Claims, 1 Drawing Sheet

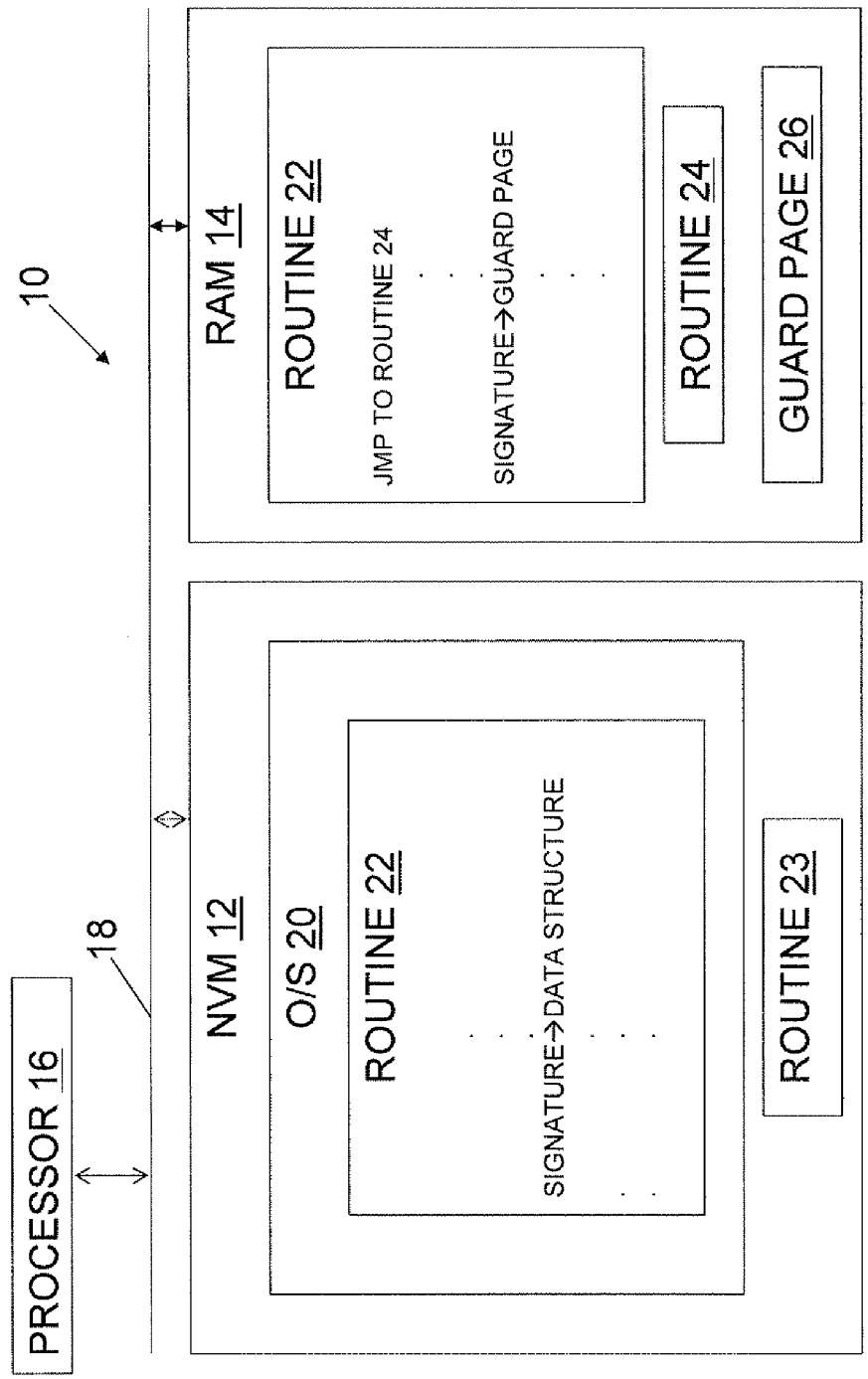

METHOD OF DEFENDING A COMPUTER FROM MALWARE

FIELD AND BACKGROUND OF THE INVENTION

The present invention relates to computer security and, more particularly, to a method of defending a computer against malware.

Targeted malware uses sophisticated methods to evade detection by security software such as antivirus software that rely on operating system functionality to provide notification of suspicious events.

One such method targets the PsSetCreateProcessNotifyRoutine routine of Microsoft Windows™ operating systems. PsSetCreateProcessNotifyRoutine adds a driver-supplied callback routine to, or removes such a callback routine from, a list, in a memory region of a computer that uses a Microsoft Windows™ operating system, of routines that are to be called whenever a process is created or deleted. Malware is known that reads the PsSetCreateProcessNotifyRoutine code at runtime, finds a binary signature in the code that identifies the address of the memory region that PsSetCreateProcessNotifyRoutine uses to maintain its list of callback routines, and then reads the address of the memory region. Then, after antivirus software has called PsSetCreateProcessNotifyRoutine in order to be notified when processes, including malware processes, are created, the malware can remove the associated callback routine from the list, thereby disabling the antivirus software from recognizing when malware processes are created.

It would be highly advantageous to have a method of defending a computer from such malware.

SUMMARY OF THE INVENTION

According to the present invention there is provided a method of defending a computer from malware, including: (a) identifying first executable code, of the computer, that includes a signature that identifies an address, in a memory of the computer, of a respective data structure that is potentially vulnerable to tampering by the malware; (b) providing, to the computer, second executable code that emulates the first executable code; and (e) modifying the first executable code so that an execution of the first executable code jumps to the second executable code before accessing the respective data structure of the first executable code.

According to the present invention there is provided a computer including: (a) a first memory; (b) a second memory; (c) in the first memory: (i) first executable code that includes: (A) program code for accessing a data structure in the memory that is potentially vulnerable to tampering by malware, and (B) a signature that is interpreted by the malware as identifying an address of the data structure, and (ii) second is executable code that includes: (A) program code for providing third executable code that emulates the first executable code, and (B) program code for modifying a first copy of the first executable code in the second memory by inserting into the first copy an instruction to jump to the third executable code before the program code for accessing the data structure is executed; and (d) a processor for executing the executable codes in the second memory.

According to the present invention there is provided a computer-readable storage medium having non-transient computer-readable code embodied on the computer-readable storage medium, the computer-readable code for defending from malware a computer that includes a memory wherein is stored first executable code that includes: (a) program code for accessing a data structure in the memory that is potentially vulnerable to tampering by the malware, and (b) a signature that is interpreted by the malware as identifying an address of the data structure, the computer-readable code including: (a) program code for providing second executable code that emulates the first executable code; and (b) program code for inserting into the first executable code an instruction to jump to the second executable code before the program code for accessing the data structure is executed.

In the basic method of the present invention, for defending a computer from malware, first executable code that might be of interest to a malicious hacker is identified. Specifically, the first executable code would include a signature that identifies an address, in a memory of the computer, of a data structure that is respective to the first executable code and that is potentially vulnerable to being tampered with by the malware. The vulnerability is a "potential" vulnerability because, almost by definition, it never is known with certainty, in advance, what attacks will be initiated by malicious hackers. Second executable code that emulates the first executable code is provided to the computer. The first executable code is modified so that when the first executable code is executed the execution jumps to the second executable code before the execution accesses (reads, writes or erases) the respective data structure of the first executable code.

Preferably, the address of the respective data structure of the first executable code is replaced with the address of a guard page in the memory of the computer, so that the signature identifies the address of the guard page.

Typically, the first executable code is a portion of an operating system of the computer.

One example of such first executable code is code for maintaining, in its respective data structure, a list of routines to be called whenever a process is created or deleted.

Preferably, the second executable code emulates the first executable code using its own respective data structure. The address of that data structure could be either the same as the address, in the memory of the computer, of the respective data structure of the first executable code, or different from the address, in the memory of the computer, of the respective data structure of the first executable code. In this context, the "memory" of the computer is all of the memory devices of the computer.

Preferably, the second executable code is provided by steps including copying the first executable code.

The scope of the present invention also includes a computer with a first (preferably non-volatiel) memory in which is stored executable code for implementing the method of the present invention and a processor for executing the code as copied to a second (preferably random access) memory.

The scope of the present invention also includes a computer-readable storage medium having embodied thereon non-transient computer-readable code for implementing the method of the present invention.

BRIEF DESCRIPTION OF THE DRAWINGS

Various embodiments are herein described, by way of example only, with reference to the accompanying drawings, wherein:

the sole FIGURE is a high-level partial block diagram of a computer that is configured to defend itself from malware according to the principles of the present invention.

DESCRIPTION OF THE PREFERRED EMBODIMENTS

The principles and operation of computer security according to the present invention may be better understood with reference to the drawings and the accompanying description.

The following description uses the Windows™ operating system and its PsSetCreateProcessNotifyRoutine routine as an example. It will be obvious to those skilled in the art how to apply the principles of the present invention to similar routines, of any operating system, that maintain data structures that are of interest to malware.

The present invention adds to the Windows™ operating system, at boot time, another routine, with a different name that is not recognized by the malware as being a routine of interest. For the purpose of exposition the new routine is called "SubstituteNotifyRoutine" herein. In the preferred embodiments of the present invention, the new routine is not given a name of its own but instead is referred to only by its address in memory. SubstituteNotifyRoutine emulates PsSetCreateProcessNotifyRoutine but preferably uses a different address in the memory of the computer for storing its list of callback routines. PsSetCreateProcessNotifyRoutine itself is modified in two ways:

1. A JMP instruction that jumps to SubstituteNotifyRoutine is inserted in PsSetCreateProcessNotifyRoutine as its first instruction.

2. An address of a guard page is substituted for the address of the memory region where PsSetCreateProcessNotifyRoutine would have stored its list of callback routines. A guard page is a page in memory such that the operating system issues an alarm when a processor of the computer attempts to access that page.

Now, when the malware reads the code of PsSetCreateProcessNotifyRoutine at runtime, the malware reads the address of the guard page and thinks that that address is the address of the memory region that PsSetCreateProcessNotifyRoutine uses to store its list of callback routines. Later, when the malware attempts to sabotage that list of callback routines, the malware accesses the guard page and the operating system issues an alarm.

Referring now to the drawings, the FIGURE is a high-level partial block diagram of a computer 10 that is configured to defend itself from malware according to the principles of the present invention. For clarity of illustration, only the components of computer 10 that are directly relevant to the present invention are illustrated. Device 10 includes a non-volatile memory (NVM) 12, a random access memory (RAM) 14, and a processor 16, all communicating with each other via a bus 18. An operating system (O/S) 20 of the device is stored in NVM 12. When computer 10 is booted, processor 16 runs boot code (not shown) to load the code of O/S 20 into RAM 14. Then, processor 16 executes the code of O/S 20 in RAM 14 in order to operate computer 10. O/S 20 includes a "vulnerable" routine 22 that, if not modified according to the principles of the present invention, would maintain, either in NVM 12 or in RAM 14, a data structure that is of interest to malware. Also stored in NVM 12 is code 23 for finding the location of routine 22 in RAM 14, just as malware would find that location, and copying the code of routine 22 to a "substitute" routine 24 in RAM 14 that emulates routine 22. Code 23 then inserts a JMP to routine 24 into routine 22 in RAM 14 as the first instruction of routine 22. and changes the binary signature in routine 22, that otherwise would identify the address of the data structure, to the address of a guard page 26 in RAM 14. Optionally, code 23 also changes that binary signature in routine 24 to the address of a different location in RAM 14.

Non-volatile memory 12 is an example of a computer-readable storage medium bearing computer-readable code for implementing the data validation methodology described herein. Other examples of such computer-readable storage media include read-only memories such as CDs bearing such code.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method of defending a computer from malware, comprising:
    (a) identifying first executable code, of the computer, that includes a signature that identifies an address, in a memory of the computer, of a respective data structure that is potentially vulnerable to tampering by the malware;
    (b) providing, after said identifying, to the computer, second executable code that emulates said first executable code;
    (c) modifying, after said providing, a portion of said first executable code so that when the modified first executable code is executed, said first executable code jumps to said second executable code before accessing said respective data structure of said first executable code; and
    (d) replacing, after said identifying, in said first executable code, said address of said respective data structure with a second address other than said address of said respective data structure so that said signature identifies said second address,
    wherein said replacing is with an address of a guard page in said memory of the computer.

2. The method of claim 1, wherein said first executable code is a portion of an operating system.

3. The method of claim 1, wherein said first executable code is for maintaining, in said respective data structure of said first executable code, a list of routines to be called whenever a process is created or deleted.

4. The method of claim 1, wherein said providing of said second executable code is effected by steps including copying said first executable code.

5. A computer comprising:
    (a) a first memory;
    (b) a second memory;
    (c) first executable code in said first memory;
    (d) a first copy of said first executable code, said first copy in said second memory;
    (d) second executable code that emulates said first executable code, said second executable code in said second memory;
    (e) third executable code in said second memory;
    wherein said first executable code includes:
        (A) program code for accessing a data structure in said second memory that is potentially vulnerable to tampering by malware, and
        (B) a signature that is interpreted by said malware as identifying an address of said data structure, and wherein said third executable code includes program code for:
- (A) providing said second executable code;
- (B) modifying, after said providing, a portion of said first copy by inserting into said first copy an instruction to jump to said second executable code before said program code for accessing said data structure is executed, and
- (C) replacing, in said first copy, said address of said data structure with a second address other than said address of said respective data structure so that said signature identifies said second address,
- (d) a processor for executing said executable codes in said second memory wherein said third executable code does said replacing with an address of a guard page, so that said malware interprets said signature as identifying said address of said guard page.

6. The computer of claim 5, wherein said second executable code is provided as a second copy of said first executable code in said second memory.

7. The computer of claim 6, wherein said third executable code also includes:
- (D) program code for modifying said second executable code by changing said address to an address of a second data structure.

8. The computer of claim 5, wherein said first memory is a nonvolatile memory.

9. The computer of claim 5, wherein said second memory is a random access memory.

10. A non-transitory computer-readable storage medium having non-transient computer-readable code embodied thereon, the computer-readable code when executed defends from malware a computer that includes a memory wherein is stored first executable code that includes:
- (a) program code for accessing a data structure in the memory that is potentially vulnerable to tampering by the malware, and
- (b) a signature that is interpreted by the malware as identifying an address of said data structure, the computer-readable code comprising program code for:
- (a) providing second executable code that emulates said first executable code; and
- (b) modifying, after said providing, a portion of the first executable code with an instruction to jump to said second executable code before said first executable code for accessing the data structure is executed, and
- (c) replacing, in said first executable code, said address of said data structure with a second address other than said address of said respective data structure so that said signature identifies said second address, wherein the computer-readable code's program code does said replacing with an address of a guard page, so that the malware interprets said signature as identifying said address of said guard page.

11. The non-transitory computer-readable storage medium of claim 10, wherein said second executable code is provided by copying the first executable code before modifying the first executable code.

12. The non-transitory computer-readable storage medium of claim 11, wherein the computer-readable code further comprises:
- (d) program code for modifying said second executable code by changing said address of said data structure.

* * * * *